A. Crosby,
Rotary Steam Valve.

No. 921. Reissued Mar. 6, 1860.

Witnesses.
Allen Hemeseley
Thomas Van Cortlandt

Inventor.
Addison Crosby

N. PETERS, PHOTO-LITHOGRAPHER, WASHINGTON, D. C.

UNITED STATES PATENT OFFICE.

ADDISON CROSBY, OF FREDONIA, NEW YORK.

IMPROVED VALVE FOR STEAM-ENGINES.

Specification forming part of Letters Patent No. 25,248, dated August 30, 1859; Reissue No. 921, dated March 6, 1860.

*To all whom it may concern:*

Be it known that I, ADDISON CROSBY, of Fredonia, in the county of Chautauqua and State of New York, have invented a new and Improved Valve for the Induction and Eduction of Steam to and from Steam-Engines, and for other Purposes; and I do hereby declare that the following is a full, clear, and exact description of the same, reference being had to the accompanying drawings, forming part of this specification, in which—

Figure 1:
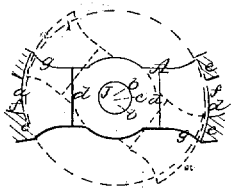
Figure 2:
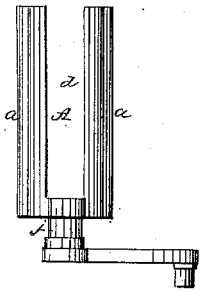
Figure 3:
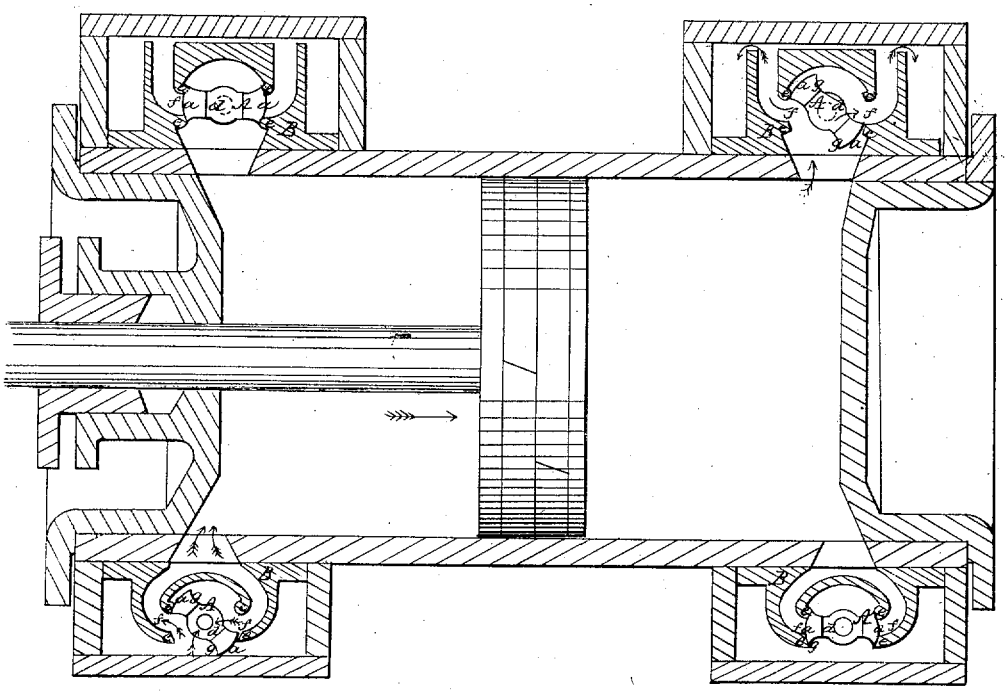

Figure 1 is a transverse section of the valve. Fig. 2 is a longitudinal view of the same. Fig. 3 is a central longitudinal section of the cylinder of a steam engine, showing the manner of applying a set of such valves for induction and eduction.

Similar letters of reference indicate corresponding parts in the several figures.

My invention consists in a valve of the oscillating kind, constructed as hereinafter described, with an opening through it, and with two opposite faces eccentric to its axis of oscillation, and fitted to a double seat of correspondently eccentric form, which contains opposite ports or openings which are covered and closed by the faces of the valve whenever the valve bears upon its seat, such valve, when used in a steam-engine or other apparatus in which there is pressure of steam or other fluid, being subject, when closed, to just sufficient pressure of steam to keep it tight, but very perfectly balanced as soon as it commences opening, and in all its applications working entirely without friction between its faces and seat.

To enable others skilled in the art to make and use my invention, I will proceed to describe its construction and operation.

A, Figs. 1 and 2, is the valve, composed of two eccentric segments united at one or both ends, and provided with a journal, *j*, at either or both ends, to work in a suitable bearing in the end of the valve box or side of the steam-chest which contains the valve-seat. The faces *a a* of the two segments are described from two different centers, *b b*, Fig. 1, which are equidistant from but on opposite sides of the center of oscillation *c* of the valve; and their eccentricity to the center *c* is made apparent in Fig. 1 by the representation of the red circle, which is concentric with the center *c*. *d* is the opening through the valve, extending nearly from one end to the other between the two eccentric segments. The seat for this valve has two faces, *e e*, which correspond in form with the faces *a a* of the valve, so that the valve may fit steam-tight therein, and in each seat there is a port, *f*. I propose generally to make the seat in a box, which can be inserted within the steam-chest or other place where the valve is to be used and removed therefrom with facility.

In applying my improved valves to a steam-engine a set of four is necessary—viz., two for induction and two for eduction, the induction-valves being arranged on one side and the eduction-valves on the opposite side of the cylinder, as shown in Fig. 3, where A A represent the induction and A′ A′ the eduction valves. The valve-boxes B B, which contain the induction-valves, have a somewhat different arrangement of passages in connection with their ports *f f* to the arrangement in the boxes B′ B′, which contain the eduction-valves, but these arrangements of passages need no particular description, as it will be obvious to the engineer that the arrangement may be varied almost indefinitely. The direction in which the steam passes through the valves, ports, and passages is indicated in Fig. 3 by arrows.

It will be readily understood by reference to the dotted outline of the valve in Fig. 1, representing it open, and by reference to the left-hand induction and the right-hand eduction valves in Fig. 3, that as soon as the valve is opened in the slightest degree it is entirely surrounded by steam, and so perfectly balanced.

It will also be understood by a comparison of the bold outline and the dotted outline of the valve in Fig. 1 that as the valve opens its faces leave the seat, and that it is only while the valve is closed that it touches the seat, and hence it works without any friction but that of its journal or journals, which is inconsiderable, and without any wear of its faces; and it will be understood by reference to the bold outline of the valve in Fig. 1, and to the right-hand induction-valve and left-hand eduction-valve in Fig. 2, which are closed, that the pressure of the steam on the excess of surface presented by the sides *g g* of the segments of the valves will tend to keep the valves closed tightly. This excess of surface is, however, so slight that the pressure upon it causes comparatively little resistance to the openings of the valves.

This valve, it may be observed, bears some resemblance to two well-known kinds of valves—viz., the butterfly-valve and the rolling valve—but yet differs essentially from both. It resembles the butterfly-valve in its having two eccentric faces, but differs from it in having an opening right through it between its faces, and in having its ports opening into the faces of its seat so that they are closed by being covered by its own face, and, further, in its spindle never being subject to lateral pressure. In its construction it resembles some of the rolling valves in all essential points but in the eccentricity of its faces and those of its seat, and this point of difference changes entirely the character of its operation, for it is not only kept tight by the pressure to which it is subject when close, but is free of its seat as soon as it commences to open, while those valves remain as closely in contact with their seats during their whole, or nearly their whole, movement as they do when perfectly closed, and, if they fit properly, are subject to friction.

What I claim as my invention, and desire to secure by Letters Patent, is—

The oscillating valve constructed with an opening right through it and with two eccentric faces, and fitted to a double seat of correspondently eccentric form, which contains opposite ports or openings that are covered and closed by the faces of the said valve whenever the said valve is in contact with the said seat, substantially as herein described.

ADDISON CROSBY.

Witnesses:
W. THOMPSON,
M. M. LIVINGSTON.